US006633569B2

(12) United States Patent
Hemmady

(10) Patent No.: US 6,633,569 B2
(45) Date of Patent: *Oct. 14, 2003

(54) SYSTEM AND METHOD FOR ROUTING DATA CELLS THROUGH AN ATM ARCHITECTURE USING QUALITY OF SERVICE DATA IN A SERVICE CONTROL POINT

(75) Inventor: Ajit G. Hemmady, Plano, TX (US)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,696

(22) Filed: Apr. 16, 1998

(65) Prior Publication Data

US 2002/0126674 A1 Sep. 12, 2002

(51) Int. Cl.[7] .......................... H04L 12/28; H04L 12/56
(52) U.S. Cl. .................. 370/398; 370/231; 370/395.21; 370/422
(58) Field of Search ............................... 370/232, 230, 370/256, 236, 258, 218, 468, 347, 401, 397, 352, 496, 524, 420, 348, 219, 231, 237, 412, 394, 395, 398, 399, 395.2, 395.21; 709/236, 239

(56) References Cited

U.S. PATENT DOCUMENTS

| | | | | |
|---|---|---|---|---|
| 5,347,511 A | * | 9/1994 | Gun | 370/255 |
| 5,436,886 A | * | 7/1995 | McGill | 370/219 |
| 5,509,010 A | * | 4/1996 | La Porta et al. | 370/68.1 |
| 5,623,495 A | * | 4/1997 | Eng et al. | 370/397 |
| 5,850,395 A | * | 12/1998 | Hauser et al. | 370/398 |
| 5,872,773 A | * | 2/1999 | Katzela et al. | 370/256 |
| 5,898,673 A | * | 4/1999 | Riggan et al. | 370/237 |
| 5,930,259 A | * | 7/1999 | Katsube et al. | 370/409 |
| 5,933,412 A | * | 8/1999 | Choudhury et al. | 370/218 |
| 5,933,425 A | * | 8/1999 | Iwata | 370/351 |
| 6,031,832 A | * | 2/2000 | Turina | 370/348 |
| 6,108,304 A | * | 8/2000 | Abe et al. | 370/232 |
| 6,122,252 A | * | 9/2000 | Aimoto et al. | 370/235 |
| 6,125,123 A | * | 9/2000 | Furuno | 370/467 |
| 6,226,263 B1 | * | 5/2001 | Iwase et al. | 370/231 |
| 6,275,493 B1 | * | 8/2001 | Morris et al. | 370/395 |
| 6,430,157 B1 | * | 8/2002 | Uriu et al. | 370/236.1 |

OTHER PUBLICATIONS

The ATM Forum Technical Committee, "ATM User Network Interface (UNI) Signaling Specification", Version 4.0 Chapter 9, Ref. No. af–sig–0061.000, Jul. 1996.*
The ATM Forum Technical Committee, "ATM User–Network Interface (UNI) Signaling Specification", Version 4.0, Chapt. 9, Ref. No. af–sig–0061.000, Jul. 1996.
The ATM Forum Technical Committee, "Traffic Management Specification", Version 4.0, Chapt. 3, Ref. No. af–tm–0056.000, Apr. 1996.
The ATM Forum Technical Committee, "Private Network–Network Interface Specification Version 10", pp. 198–201, PNNI 1.0, Ref. No. af–pnni–0055.000 Letter Ballot, Mar. 1996.

* cited by examiner

Primary Examiner—Douglas Olms
Assistant Examiner—Bob A. Phunkulh

(57) ABSTRACT

There is disclosed, for use in an asynchronous transfer mode (ATM) network, an ATM switch controller capable of routing a call through the ATM network. The ATM switch controller comprises: 1) a database capable of storing at least one of quality of service (QoS) data and congestion level data received from a plurality of ATM switches in the ATM network; and 2) a route selection controller capable of receiving a call request from a first of the plurality of ATM switches and selecting a call route connection to a second of the plurality of ATM switches, wherein the second ATM switch adjoins the first ATM switch and the selected call route connection is selected in response to at least one of QoS data and congestion level data of the second ATM switch stored in the database.

20 Claims, 6 Drawing Sheets

| CELL BYTE NUMBER | VALUE RANGE | MEANING |
|---|---|---|
| 0 THRU 4 | PER ATM STANDARDS | CELL HEADER |
| 5 AND 6 | 0 - 65535 | TRANSMITTING SWITCH IDENTITY |
| 7 AND 8 | 0 - 65535 | PORT IDENTITY |
| 9 | 0 - 255 | PCR BUFFER CONGESTION LEVEL |
| 10 | 0 - 255 | SCR BUFFER CONGESTION LEVEL |
| 11 | 0 - 255 | MBS BUFFER SIZE 1 CONGESTION LEVEL |
| 12 | 0 - 255 | MBS BUFFER SIZE 2 CONGESTION LEVEL |
| 13 | 0 - 255 | MBS BUFFER SIZE 3 CONGESTION LEVEL |
| 14 | 0 - 255 | MBS BUFFER SIZE 4 CONGESTION LEVEL |
| 15 | 0 - 255 | MBS BUFFER SIZE 5 CONGESTION LEVEL |
| 16 AND 17 | 0 - 65535 | CIF/TBE BUFFER SPACE AVAILABLE |
| 18 | 0 - 255 | CURRENT CDV = 0 OR (1 TO 255) X 10 MICROSECONDS |
| 19 | 0 - 255 | CURRENT CBR CTD = 0 OR (1 TO 255) X 10 MICROSEC. |
| 20 | 0 - 255 | CURRENT RTVBR CTD = 0 OR (1 TO 255) X 10 MICROSEC. |
| 21 | 0 - 255 | CURRENT NRTVBR CTD = 0 TO (1 TO 255) X 10 MICROSEC. |
| 22 | 0% - 100% | CURRENT CLR FOR CBR |
| 23 | 0% - 100% | CURRENT CLR FOR RTVBR |
| 24 | 0% - 100% | CURRENT CLR FOR NRTVBR |
| 25 THRU 52 | NOT USED | RESERVED FOR FUTURE USE |

SYSTEM AND METHOD FOR ROUTING DATA CELLS THROUGH AN ATM ARCHITECTURE USING QUALITY OF SERVICE DATA IN A SERVICE CONTROL POINT

CROSS-REFERENCE TO RELATED APPLICATIONS

The present invention is related to that disclosed in U.S. patent application Ser. No. 09/061,430, entitled "SYSTEM AND METHOD IN AN ATM SWITCH FOR DYNAMICALLY ROUTING DATA CELLS USING QUALITY OF SERVICE DATA" and filed concurrently herewith. U.S. patent application Ser. No. 09/061,430 is commonly assigned with the present invention and is incorporated herein by reference for all purposes.

TECHNICAL FIELD OF THE INVENTION

The present invention is directed, in general, to switching devices and, more specifically, to a service control point in an ATM architecture that uses measured quality of service data from ATM switches to route data cells.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

The increased popularity of LANs has led, in turn, to the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. The increased popularity of LANs has also led to an increase in the number of applications requiring very high-speed data transmission. Applications such as video conferencing require a large amount of bandwidth to transfer data and are relatively intolerant of switching delays.

The need for higher speed communication protocols that are less susceptible to switching delays has led to the development of the asynchronous transfer mode (ATM) telecommunications standard. ATM was originally intended as a service for the broadband public telephone network. Although designed primarily for the high-speed transfer of video and multimedia information, the most popular applications for ATM so far have been data transmission. ATM is widely used as the backbone of large business networks and in wide area networks.

ATM provides speeds from 50 Mbps up to 10 Gbps using fast packet switching technology for high performance. ATM uses small fixed-size packets, called "cells". A cell is a 53-byte packet comprising 5 bytes of header/descriptor information and a 48-byte payload of voice, data or video traffic. The header information contains routing tags and/or multi-cast group numbers that are used to configure switches in the ATM network path to deliver the cells to the final destination.

Many packet switching architectures have been developed for implementation in ATM networks. One such architecture, known as multistage interconnection network (MIN), comprises a switching fabric that routes packets received from one of N input ports to one or more of N output ports. The multistage interconnection network comprises groups of switching elements arranged in multiple stages. Each stage uses one or more bits in the packet (or cell) header to select the output to which the input packet is routed. This type of routing is known as "self-routing".

Customer demand for additional bandwidth beyond the capabilities of frame relay and other technologies has led the majority of telecommunication carriers to offer ATM service to customers. ATM service has low latency and predictable throughput due to the small cell size and tremendous speed of ATM technology. This makes ATM service desirable in networks that handle a mixture of data types, such as voice and video. ATM applications include conventional data transfers, imaging, full-motion video, and multimedia.

One important feature of ATM service is the ability to establish specific Quality of Service (QoS) levels to meet each customer's needs. The QoS requirement is critical in delay-sensitive applications, such as real-time audio, real-time video, and, to a lesser extent, Internet telephony. In broadband connections, the QoS of an end-to-end connection is very important, especially for constant bit rate (CBR) and real-time variable bit rate (RT-VBR) traffic connections.

The path that an ATM cell takes through an ATM network may be determined by several different well-known route selection algorithms. Generally, these prior art route selection algorithms are based on "static" routing tables and do not take into account present resource (e.g., switch) congestion or certain critical QoS factors. In many cases, the route taken through the entire ATM network, or at least a significant portion of it, is selected by the source switch without giving consideration to dynamic traffic congestion levels and QoS conditions at intermediate switches along the path.

Protocols exist in the prior art that verify whether a connection already established by a route selection algorithm in a switch satisfies the end users QoS requirements. If the established connection does not meet the end-user's needs, the protocol causes the switch to terminate the connection. The route selection algorithm must then select another route and the QoS requirements must be re-verified. The prior art algorithms do not attempt to use QoS data/statistics in the initial selection of a route through an ATM network.

There is therefore a need in the art for an improved ATM switch architecture capable of selecting an optimal route through an ATM network on the first connection attempt. In particular, there is a need for an improved ATM switch architecture that uses relevant QoS data to select an optimal route through an ATM network on the first connection attempt. There is a still further need for an improved ATM switch architecture that uses the most recent traffic congestion and QoS data to select an optimal route through an ATM network on the first connection attempt.

SUMMARY OF THE INVENTION

To address the above-discussed deficiencies of the prior art, it is a primary object of the present invention to improve the call/connection setup time of a switched virtual circuit (SVC) or a permanent virtual circuit (PVC) in an ATM network by using the most recent congestion and quality of service (QoS) data within the ATM switches located in the ATM network. It is another object of the present invention to provide a deterministic method for selecting a route for a SVC or PVC in an ATM network that will satisfy the QoS requirements of an end user.

These objectives are met by use of a special purpose connection between adjoining ATM switches in an ATM network or between an ATM switch and a service control point (SCP) or a network management server (NMS) in an ATM network. This special purpose connection comprises a virtual channel circuit (VCC) connection that is established between adjoining ATM switches, or between an ATM switch and an SCP or NMS. The VCC connection is used to transfer to a recipient ATM switch selected traffic congestion data and selected QoS data about other ATM switches, such as, for example, the sending ATM switch. The VCC connection may also be used to transfer to an SCP or an NMS selected traffic congestion data and selected QoS data about ATM switches in the network.

Accordingly, one advantageous embodiment of the present invention comprises, for use in an asynchronous transfer mode (ATM) network, an ATM switch controller capable of routing a call through the ATM network. The ATM switch controller comprises: 1) a database capable of storing at least one of quality of service (QoS) data and congestion level data received from a plurality of ATM switches in the ATM network; and 2) a route selection controller capable of receiving a call request from a first of the plurality of ATM switches and selecting a call route connection to a second of the plurality of ATM switches, wherein the second ATM switch adjoins the first ATM switch and the selected call route connection is selected in response to at least one of QoS data and congestion level data of the second ATM switch stored in the database.

According to one embodiment of the present invention, the route selection controller is capable of detecting QoS cells containing at least one of QoS data and congestion level data received from the plurality of ATM switches.

According to another embodiment of the present invention, at least one of QoS data and congestion level data of the second switch is associated with a specific port on the second ATM switch.

In another embodiment of the present invention, the route selection controller selects the selected call route connection if at least one of the QoS data and congestion level data associated with the specific port on the ATM switch compares favorably with a QoS requirement associated with the call request.

In still another embodiment of the present invention, the ATM switch controller is disposed in a service control point in an SS7 network.

In a further embodiment of the present invention, the selected call route connection is a switched virtual circuit connection.

In yet another embodiment of the present invention, the route selection controller selects a call route connection through a selected plurality of the ATM switches and transfers substantially in parallel to the selected plurality of ATM switches call route connection data operable to cause the selected plurality of ATM switches to form the selected call route connection.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3 is a block diagram depicting in greater detail QoS and traffic congestion data in the cell payload of the exemplary QoS cell 200 depicted in FIG. 2, according to one embodiment of the present invention;

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
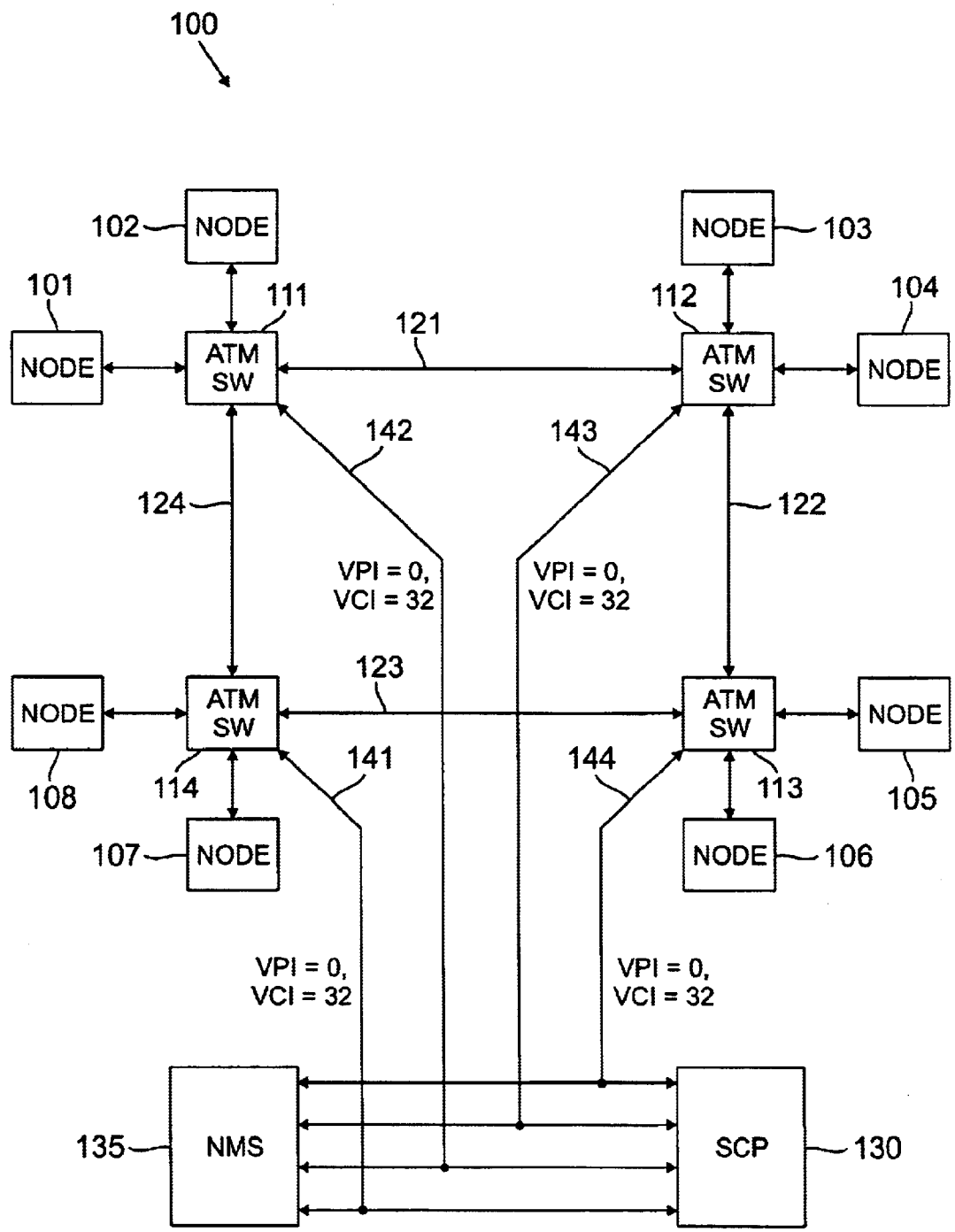
FIG. 1 illustrates an exemplary ATM switch architecture 100 according to one embodiment of the present invention.

FIG. 1 illustrates an exemplary ATM switch architecture 100 according to one embodiment of the present invention. ATM switch architecture 100 comprises adjoining ATM switches 111–114, which are interconnected by network links 121–124. Throughout this disclosure, the word "adjoining" means, with respect to ATM switches 111–114, that ATM switches 111–114 are directly coupled to one another, without any intermediate routing switches. ATM cell packets are transferred bidirectionally between ATM switch 111 and ATM switch 112 across network link 121; between ATM switch 112 and ATM switch 113 across network link 122; between ATM switch 113 and ATM switch 114 across network link 123; and between ATM switch 114 and ATM switch 111 across network link 124.

In the exemplary ATM switch architecture 100 in FIG. 1, network nodes 101–108 are coupled to, and exchange data via, ATM switches 111–114. For example, node 102 may communicate bidirectionally with node 106 via ATM switches 111, 112, and 113. Alternatively, node 102 may communicate bidirectionally with node 106 via ATM switches 111, 114, and 113. Network nodes 101–108 may comprise end-user processing devices, such as desktop personal computers (PCs), printers, network servers, telephones, video conferencing equipment, and the like. Network nodes 101–108 may also comprise additional data transfer devices, such as other ATM switches, or network routers, and bridges.

ATM switch architecture 100 also comprises a service control point (SCP) 130 and a network management system (NMS) 135. ATM switches 111–114 are coupled to service control point 130 and network management system 135 via network links 141–144. The purposes and operation of service control points are well known in the art. SCP 130 contains a database within, for example, a System Signaling 7 network that provides translation and routing data needed to deliver advanced network services such as "800" number translation. The advance network services provided by SCP 130 are separated from the actual ATM switches 111–114 to make it easier to introduce new services into the ATM network among other reasons.

Network management system 135 is used to monitor, control and manage ATM switch architecture 100. Importantly, one of the responsibilities of network management server 135 is to establish permanent virtual circuit (PVC) connections in ATM switch architecture 100. PVC connections are established by network management system 135 rather than by a signaling protocol, as in the case of a switched virtual circuit (SVC) connection. A PVC connection provides the equivalent of a dedicated private line across ATM switch architecture 100 between any two of nodes 101–108. Once a PVC connection is defined, it requires no further setup operation before data is sent and no disconnect operation after data is sent.

The present invention presents two embodiments for using QoS data and traffic congestion data in the selection of data routes through the ATM switch architecture 100. According to a first embodiment of the present invention, each of ATM switches 111–114 internally uses QoS data and congestion level data gathered from adjoining ATM switches to select a route for connecting a call. In a second embodiment of the present invention, each of ATM switches 111–114 provides QoS data and traffic congestion data to an external device, such as SCP 130 or NMS 135, which then uses the QoS data and traffic congestions data of the adjoining ATM switches to perform the route selection algorithm for the requesting ATM switch.

Accordingly, in the first embodiment of the present invention, each of ATM switches 111, 112, 113, and 114 establishes a virtual channel circuit (VCC) connection with each of its adjoining switches in order to exchange traffic congestion data and specific QoS information. Each "special purpose" VCC connection uses a virtual path identifier (VPI)=0 and a virtual channel identifier (VCI)=32. For example, ATM switch 111 exchanges traffic congestion data and QoS data with adjoining switch 112 using a first VCC connection having VPI=0, VCI=32 and with adjoining switch 114 using a second VCC connection having VPI=0. VCI=32.

ATM switch 111 creates special purpose "QoS cells" for each port on ATM switch 111. The QoS cells are used to send traffic congestion data and QoS data pertaining to ATM switch 111 to ATM switches 112 and 114. The QoS cells are sent to adjoining ATM switches 112 and 114 once every M seconds, where M is a switch configurable parameter. ATM switch 112 also sends its own QoS cells containing QoS data and traffic congestion data pertaining to ATM switch 112 to ATM switch 111 (and ATM switch 113) once every N seconds, where N is a switch configurable parameter. Likewise, ATM switch 113 sends QoS cells containing QoS data and traffic congestion data pertaining to ATM switch 113 to ATM switch 112 (and ATM switch 114) once every P seconds, where P is a switch configurable parameter. Finally, ATM switch 114 sends QoS cells containing QoS data and traffic congestion data pertaining to ATM switch 114 to ATM switch 111 (and ATM switch 113) once every Q seconds, where Q is a switch configurable parameter. In the above example, the values of M, N, P and Q are independent. Hence, two or more may be equal, or none may be equal.

Each of ATM switches 111–114 maintains a database containing the QoS data and traffic congestion data of the ATM switches adjoining it. These databases may be updated every time a QoS cell is received from an adjoining switch, or may be updated less frequently, according to the configuration of the receiving ATM switch.

The operation of the first embodiment of the present invention may be explained by means of an exemplary voice call that comes into ATM switch 111 from node 101 and is directed to node 106. During the call setup time, ATM switch 111 determines the possible routing choices based on the network configuration and its routing database. The choices are based on availability of the trunk facilities (i.e., network links 121–124) between ATM switch 111 and the adjoining STM switches 112 and 114, and the destination dialed (i.e., node 106). If multiple choices are available to route the call, ATM switch 111 examines the traffic congestion data and QoS data for adjoining switches 112 and 114 that are stored in the database in ATM switch 111.

The call request also specifies the connection type for which the customer has contractually subscribed. The connection type, or ATM Traffic Category (ATC), may include real-time variable bit rate, non-real-time variable bit rate, available bit rate, constant bit rate, and the like. Based on the requested connection type, ATM switch 111 decides which of the multiple available routes (through ATM switch 112 or through ATM switch 114) is the optimal route at that instant of time. After the optimal route is selected, ATM switch 111 continues to examine the traffic congestion data and QoS data in newly arrived QoS cells from ATM switch 112 and ATM switch 114 in order to ensure that the route has adequate bandwidth and that the route satisfies the contractually specified customer QoS requirements, such as peak-to-peak cell delay variation (CDV), cell transfer delay, and cell loss rate, that were originally requested by node 101. Since each of ATM switches 111–114 follows this procedure, the amount of time required to select a route and establish the call connection is minimized. There is also a comparatively high probability that the connection selected will satisfy the customer's contractual QoS and traffic congestion requirements.

In the second embodiment of the present invention, each of ATM switches 111, 112, 113, and 114 establishes a virtual channel circuit (VCC) connection with SCP 130 and/or NMS 135 in order to transfer traffic congestion data and specific QoS information. Each "special purpose" VCC connection uses a virtual path identifier (VPI)=0 and a virtual channel identifier (VCI)=32. For example, ATM switch 111 transfers traffic congestion data and QoS data to SCP 130 using a first VCC connection having VPI=0, VCI=32 and to NMS 135 using a second VCC connection having VPI=0, VCI=32.

As before, ATM switch 111 creates special purpose "QoS cells" for each port on ATM switch 111. The QoS cells are used to send traffic congestion data and QoS data pertaining to ATM switch 111 to SCP 130 and/or NMS 135. The QoS cells are sent to SCP 130 and/or NMS 135 once every M seconds, where M is a switch configurable parameter. ATM switch 112 also sends QoS cells containing QoS data and traffic congestion data pertaining to ATM switch 112 to SCP 130 and/or NMS 135 once every N seconds, where N is a switch configurable parameter. Likewise, ATM switch 113 sends QoS cells containing QoS data and traffic congestion data pertaining to ATM switch 113 to SCP 130 and/or NMS 135 once every P seconds, where P is a switch configurable parameter. Finally, ATM switch 114 sends QoS cells containing QoS data and traffic congestion data pertaining to ATM switch 114 to SCP 130 and/or NMS 135 once every Q seconds, where Q is a switch configurable parameter. In the above example, the values of M, N, P and Q are independent. Hence, two or more may be equal, or none may be equal.

Each of SCP 130 and NMS 135 maintains a database of QoS data and traffic congestion data that are received from the ATM switches 111–114. These databases may be updated every time a QoS cell is received from one of ATM switches 111–114, or may be updated less frequently, according to the configuration of either of SCP 130 or NMS 135.

The operation of the second embodiment of the present invention also may be explained by means of an exemplary voice call that comes into ATM switch 111 from node 101 and is directed to node 106. During the call setup time, ATM switch 111 queries SCP 130 to determine the optimal routing choice based on the network configuration and its routing database. The SCP 130 bases this determination on the type of service requested, the destination number, and the current values of traffic congestion data and QoS data that SCP 130 maintains for every ATM switch in the network. The SCP 130 selects an optimal "next hop" route to an adjoining ATM switch based on the QoS data and traffic congestion data for the ATM switches adjoining the requesting ATM switch, and passes the next hop route information back to the requesting ATM switch. If the next ATM switch is not the terminating switch, then the process is repeated as the next ATM switch queries SCP 130, as before, to determine the next optimal routing choice.

The call request specifies the connection type for which the customer has contractually subscribed. The connection type, or ATM Traffic Category (ATC), may include real-time variable bit rate, non-real-time variable bit rate, available bit rate, constant bit rate, and the like. Based on the requested connection type, SCP 130 decides which of the multiple available routes is the optimal route at that instant of time. After the optimal route is selected, SCP 130 continues to receive traffic congestion data and QoS data in newly arrived QoS cells from ATM switches 111–114 in order to ensure that the route has adequate bandwidth and that the route satisfies the contractually specified customer QoS requirements, such as peak-to-peak cell delay variation (CDV), cell transfer delay, and cell loss rate, that were originally requested by node 101. Since SCP 130 establishes switched virtual circuit (SVC) connection in this manner for each of ATM switches 111–114, the amount of time required to select a route and establish the call connection is minimized. There is also a comparatively high probability that the connection selected will satisfy the customer's contractual QoS and traffic congestion requirements.

In the case of a permanent virtual circuit connection, a PVC connection is established by network management system 135, rather than by signaling, as in the case of an SVC connection. To facilitate the establishment of PVC connections, the QoS cells are transmitted by each one of ATM switches 111–114 to NMS 135 on a routine basis (i.e., once every N seconds). The entire route for a PVC connection through all necessary ATM switches is determined by NMS 135. As such, the routing table for the PVC connection is stored in NMS 135. NMS 135 also stores the traffic congestion data and QoS data received in periodic QoS cells for each port on each one of ATM switches 111–114 in ATM switch architecture 100. NMS 135 uses the traffic congestion data, the QoS data, the originating node, determinating node, and the type of connection (i.e., constant bit rate, real time variable bit rate, non-real time variable bit rate, available bit rate, etc.) as well as the traffic congestion and QoS parameters included in the call request to determine the optimal route to create the PVC connection.

Figure 2:
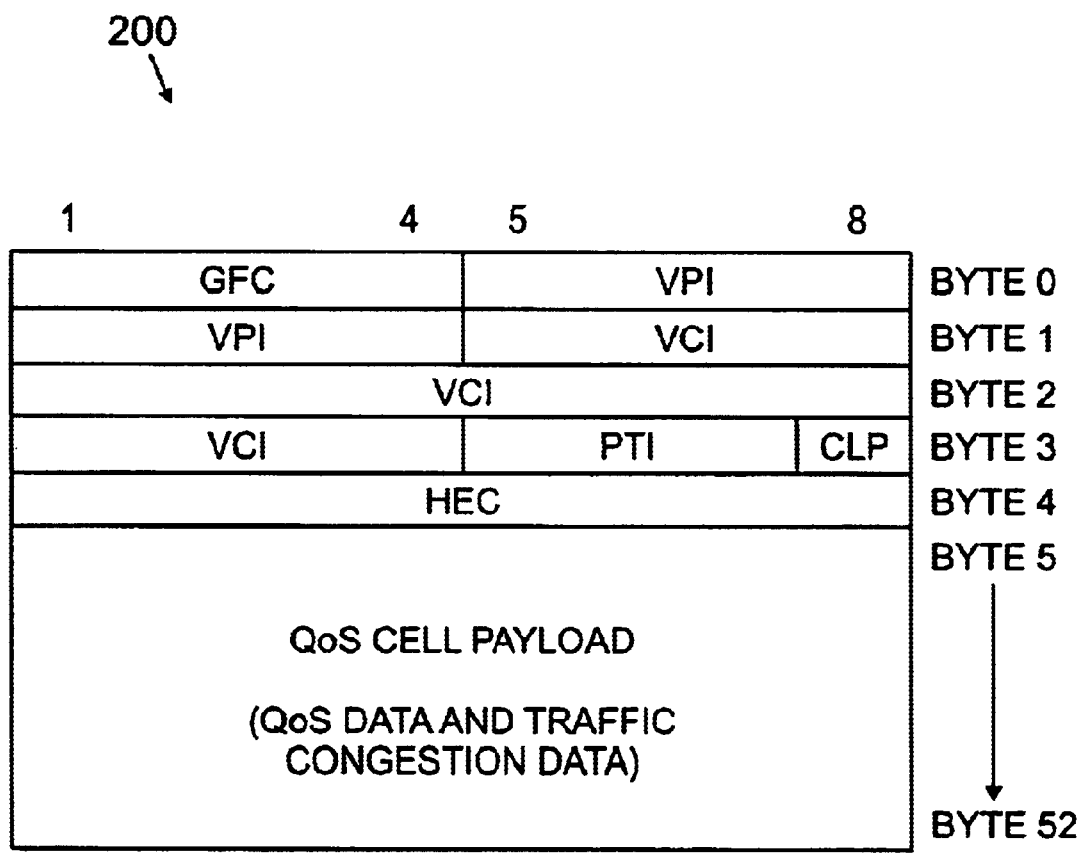
FIG. 2 is a block diagram of the ATM cell header in an exemplary QoS cell 200 according to one embodiment of the present invention.

FIG. 2 is a block diagram of an ATM cell header in an exemplary QoS cell 200 according to one embodiment of the present invention. QoS cell 200 comprises fifty-three (53) eight-bit bytes: five (5) bytes of header information (Bytes 0–4) and a forty-eight (48) byte cell payload (Bytes 5–53). The header comprises a four (4) bit general flow control (GFC) field, an eight (8) bit virtual path identifier (VPI) field, a sixteen (16) bit virtual channel identifier (VCI) field, a three (3) bit payload type indicator (PTI) field, a cell loss priority (CLP) bit, and an eight (8) bit header error control (HEC) field.

The GFC field is used to provide local functions, such as flow control, and generally has only local significance within an ATM network. The VPI field and the VCI field combine to identify a connection on an ATM network. The VPI field identifies a selected virtual path, which is a collection of virtual channels connecting two points in an ATM network. All of the ATM cells of a virtual path follow the same path through the network that was established during call set-up. The VCI field identifies a particular virtual circuit (virtual channel) which the ATM cells traverse from transmitting node to target node. A virtual circuit is a communications link for voice or data that appears to the transmitting and receiving nodes to be a dedicated point-to-point circuit. It is a logical path, rather than a physical path, for a call.

The PTI field is a value that indicates whether the ATM cell carries network management information or end-user information. For example, the PTI field of a resource management cell may have a binary value of '110', and the PTI field of an end-to-end Operations, Administration and Maintenance (OAM) flow cell may have a binary value '101'.

The CLP bit indicates one of two levels of priority for the ATM cell. If the CLP bit of an ATM cell has a binary value of '0', the ATM cell has a higher priority than an ATM cell having a binary value of '1'. Therefore, ATM cells having CLP bits=1 may be discarded first during periods of high traffic congestion in order to preserve the cell loss ratio (CLR) of ATM cells having CLP bits=1.

The HEC field is a cyclic redundancy check (CRC) code located in the fifth (last) byte of the ATM cell header. The ATM switches 111–114, SCP 130, and/or NMS 135 may check for an error and, in some cases, correct a detected error. In most cases, an error checking algorithm is used that can detect and correct a single bit error in the header and/or can detect a multi-bit error in the header.

FIG. 3 is a block diagram depicting in greater detail QoS data and traffic congestion data in the cell payload of the exemplary QoS cell 200 depicted in FIG. 2, according to one embodiment of the present invention. QoS cell 200 is used to transfer traffic congestion data and QoS data from a selected ATM switch to its adjoining ATM switches.

The following table defines the abbreviations that appear in the block diagram of QoS cell 200 in FIG. 3:

TABLE OF ABBREVIATIONS

| | |
|---|---|
| CBR | Constant Bit Rate |
| CDV | Peak-to-Peak Cell Delay Variation |
| CIF | Cells in Flight |
| CLR | Cell Loss Rate |
| CTD | Cell Transfer Delay |
| NRTVBR | Non-Real Time Variable Bit Rate |
| MBS | Maximum Burst Size |
| PCR | Peak Cell Rate |
| RTVBR | Real Time Variable Bit Rate |
| SCR | Sustained (Average) Cell Rate |
| TBE | Transient Buffer Expected |

Bytes 0–4 of QoS cell 200 are the cell header information shown above in FIG. 2. Bytes 5 and 6 of QoS cell 200 are the transmitting switch identity, that is, the ID of the ATM switch that is sending its own QoS cell to SCP 130, NMS 135 or one of ATM switches 111–114. A unique ID may be assigned to 65,536 different ATM switches. Bytes 7 and 8 of QoS cell 200 are the port identity, that is, the ID of the particular ATM switch port to which the QoS cell pertains. QoS data and congestion data is made available on a port-by-port basis for each ATM switch. Thus, a multiple port ATM switch transfers multiple QoS cells to each of its adjoining ATM switch(es), to SCP 130, or to NMS 135.

Bytes 9 and 10 of QoS cell 200 are congestion level indicators for the peak cell rate (PCR) buffer and the sustained cell rate (SCR) buffer. PCR is typically used for constant bit rate traffic where the time delay is critical. SCR is used for real-time variable bit rate (RTVBR) traffic. Bytes 11–15 of QoS cell 200 are congestion level indicators for, in an exemplary switch architecture, five different maximum burst size (MBS) buffers. The different-sized MBS buffers are used for variable bit rate traffic where cells may be received in unexpectedly large bursts. Bytes 16 and 17 contain cells in flight (CIF) data and transient buffer expected (TBE) data, which are used in connection with available bit rate (ABR) traffic.

Some of the more important quality of service (QoS) parameters in ATM broadband technology are cell delay variation, cell loss rate and cell transfer delay. When a customer signs a service contract with an ATM service provider, the contract guarantees the customer, for example, a minimum bandwidth, such as 10 Mbps, a maximum cell transfer delay, a maximum cell delay variation, and a maximum cell loss rate. If the ATM service provider does not meet these requirements, there typically are clauses that specify penalties, such as payment rebates for time periods when the customer's QoS requirements are not met.

Byte 18 of QoS cell 200 contains the cell delay variation (CDV) for the port associated with the QoS cell. The pattern and timing (i.e., spacing) of ATM cells on an output port of an ATM switch should be the same (ideally) as on the input port of the ATM switch. In reality, the cells generally are delayed by varying amounts as a result of buffering, processing, etc., within the ATM switch. Consequently, the spacing of the ATM cells vary as the ATM cells pass through the ATM switch. This variation is known as cell delay variation.

Bytes 19–21 of QoS cell 200 contain the cell transfer delay values for different types of traffic (CBR, RTVBR, and NRTVBR) for the port associated with the QoS cell. Cell transfer delay is the amount of time that elapses between the time an ATM cell enters the ATM switch and the time the ATM cell exits the ATM switch. Bytes 22–24 of QoS cell 200 contain the cell loss rate values for different types of traffic (CBR, RTVBR, and NRTVBR) for the port associated with the QoS cell. Cell loss rate is given as a percentage of the total number of ATM cells received on a particular port.

Figure 4:
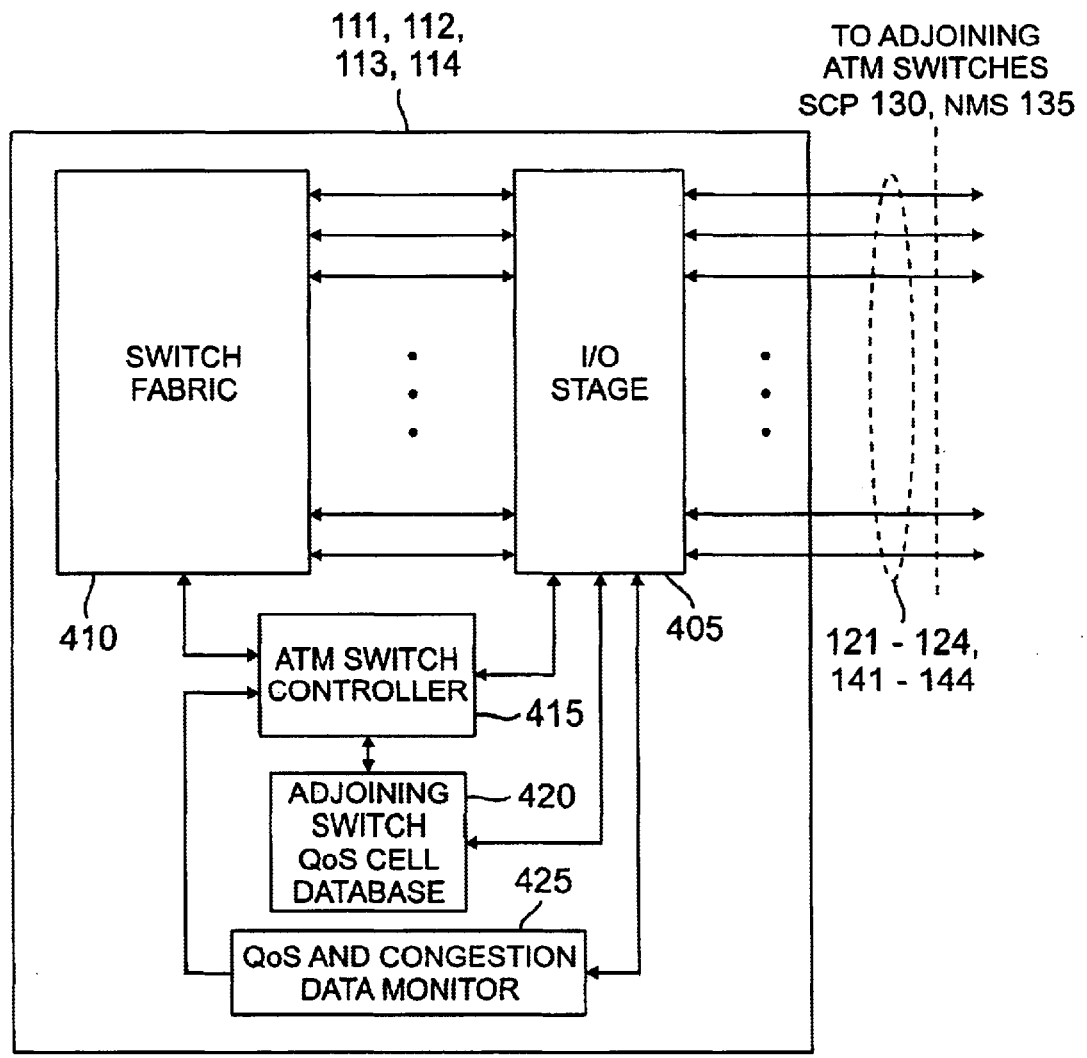
FIG. 4 is a block diagram illustrating an exemplary architecture for each of ATM switches 111–114 according to a first embodiment of the present invention.

FIG. 4 is a block diagram illustrating an exemplary architecture for each of ATM switches 111–114 according to a first embodiment of the present invention. ATM switches 111–114 comprise an input/output (I/O) stage 405 that includes I/O buffers, multiplexers, and address (cell header) decoders. I/O stage 405 receives ATM cells from adjoining switches on a plurality of trunk lines (i.e., network links 121–124) and transfers the received ATM cells to switch fabric 410. After the ATM cell header has been decoded, switch fabric 410 routes the ATM cell back to I/O stage 405, which outputs the ATM cell to the appropriate adjoining ATM switch.

The route selection for ATM cells received by each of ATM switches 111–114 is performed by ATM switch controller 415, which determines the switch positions within switch fabric 410 based on 1) the VPI and VCI fields within the ATM cell headers and 2) the QoS data and traffic congestion data of the adjoining switches, as explained below in greater detail. The relevant cell header information decoded by I/O stage 405 is sent to ATM switch controller 415. The QoS cells for adjoining switches are detected in I/O stage 405 by decoding ATM cells having a binary value "00000" in the VPI field and a binary value "11111" (i.e., 32 decimal) in the VCI field. The QoS cell payloads received by each of ATM switches 111–114 from the corresponding adjoining switches are stored in adjoining switch QoS cell database 420. The QoS cell payloads stored in QoS cell database 420 are used by ATM switch controller 415 to establish connection paths for future ATM cells by selecting switch positions within switch fabric 410 and by selecting multiplexer channels within I/O stage 405.

Each one of ATM switches 111–114 also contains a QoS and congestion data monitor 425, which measures and records appropriate ATM cell traffic loads and delay time data as ATM cells are received and/or transmitted by I/O stage 405. QoS and congestion data monitor 425 includes suitably arranged counters and clocks for determining relevant data bit rates, data burst sizes, cell delay times, and the like. The QoS data and traffic congestion data captured by QoS and congestion data monitor 425 are transferred to ATM switch controller 415, which may perform additional calculations to derive statistical parameters, such as time delay variation(s), average ATM cell rates, ATM cell loss rate(s), and the like. ATM switch controller 415 then generates a QoS cell for each port on the particular one of ATM switches 111–114 in which it resides. These QoS cells are then periodically transferred to adjoining ones of ATM switches 111–114, according to the configuration of ATM switch controller 415.

Figure 5:
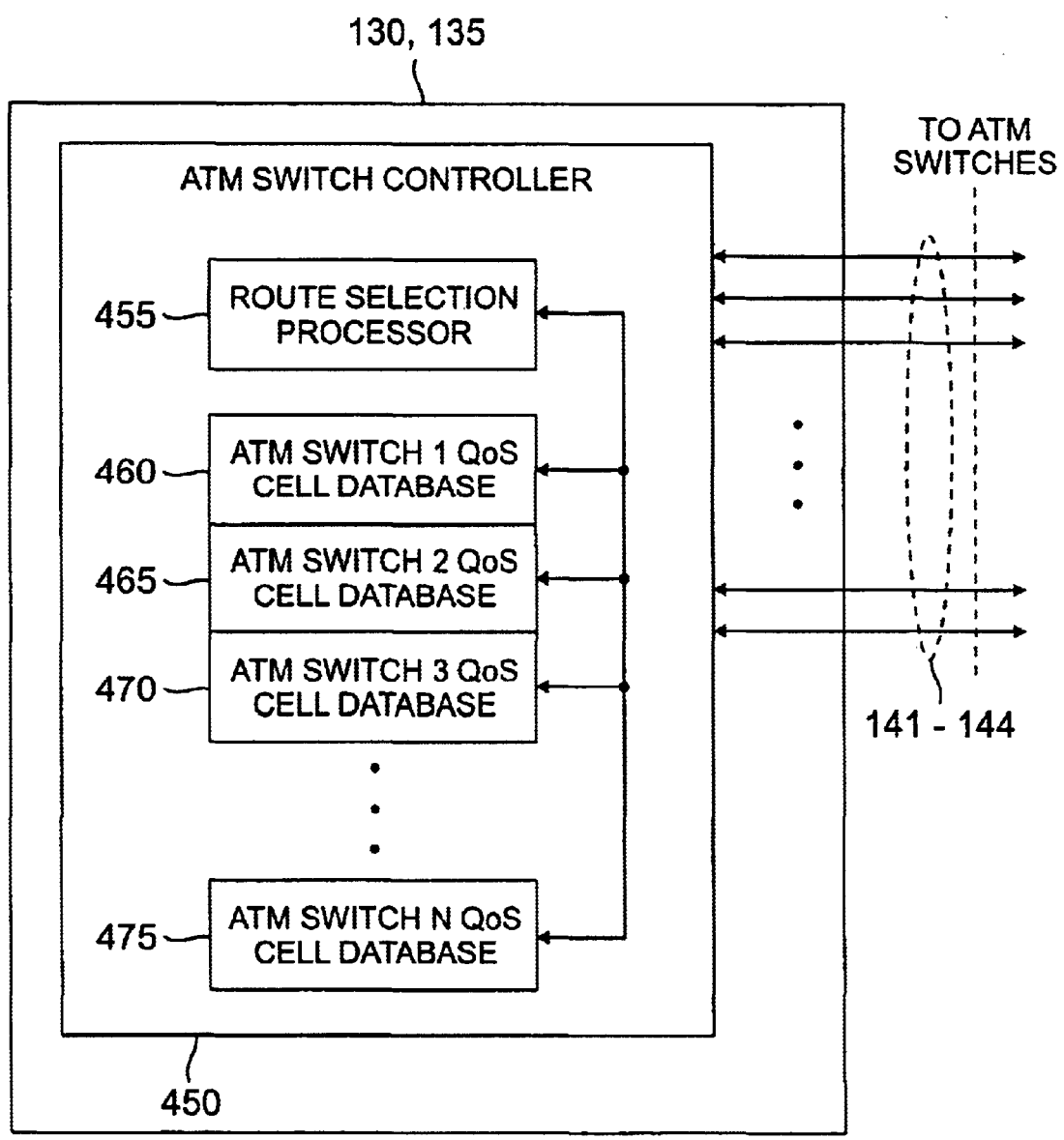
FIG. 5 is a block diagram illustrating an exemplary architecture for a service control point or a network management system according to a second embodiment of the present invention.

FIG. 5 is a block diagram illustrating an exemplary architecture for service control point (SCP) 130 or network management system (NMS) 135 according to a second embodiment of the present invention. In addition to other circuits that perform standard SCP and NMS functions, SCP 130 and NMS 135 each also comprise an ATM switch controller 450 that receives traffic congestion data and QoS data via network links 141–144 from ATM switches 111–114. ATM switch controller 450 also receives call requests from ATM switches 111–114 on network links 141–144. ATM switch controller 450 comprises a route selection processor 455 and QoS cell databases 460–475, which stores the payloads of QoS cells received from up to N different ATM switches.

Route selection processor 45 detects received QoS cells from ATM switches 111–114 by decoding ATM cells having a binary value "00000" in the VPI field and a binary value "11111" (i.e., 32 decimal) in the VCI field. The QoS cell payloads received by route selection processor 455 are stored in the appropriate one of QoS cell databases 460–475 that corresponds to the ATM switch that sent the QoS cell. Route selection processor 455 also detects call requests that are received from ATM switches 111–114. As call requests are received from ATM switches 111–114, route selection processor 455 compares traffic congestion and QoS parameters of the end user included in each call request with the traffic congestion data and QoS data of adjoining ATM switches stored in each of QoS cell database 460 through QoS cell database 475 to determine the optimal route through the requesting ATM switch.

In the case of SCP 130, the ATM switch controller 450 receives call requests from each of the ATM switches in sequence. After ATM switch controller in SCP 130 passes an optimal route back to each requesting ATM switch, the next sequential ATM switch in the optimal route repeats the call request process until the entire connection is complete. Advantageously, since SCP 130 knows the originating node and the destination node, SCP 130 can anticipate the call requests that are received from intermediate ATM switches in the optimal route. Since SCP 130 can determine the entire optimal route, SCP 130 is able to respond more rapidly to the call requests received from ATM switches 111–114. In some embodiments of the present invention, SCP 130 may determine the optimal route through only the requesting ATM switch. In other embodiments of the present invention, SCP 130 may determine the optimal route through the requesting ATM switch and at least one other ATM switch. In still other embodiments of the present invention, SCP 130 may determine the optimal route through the entire ATM switch architecture 100, from the originating node to the destination node, when the call request for a SVC connection is first received from a requesting ATM switch.

In the case of NMS 135, the entire path of a PVC connection is determined by NMS 135 through all ATM switches between the call originating node and the destination node. Thus, the routing information may be passed in parallel to all ATM switches that are forming the PVC connection. It is not necessary for NMS 135 to save the QoS parameters in order to relay them to the next ATM switch, since NMS 135 sets all ATM switches for the PVC connection at the same time. This is in contrast to a switched virtual circuit connection where each ATM switch link is selected based on a link-by-link signaling and connection protocol.

Figure 6:
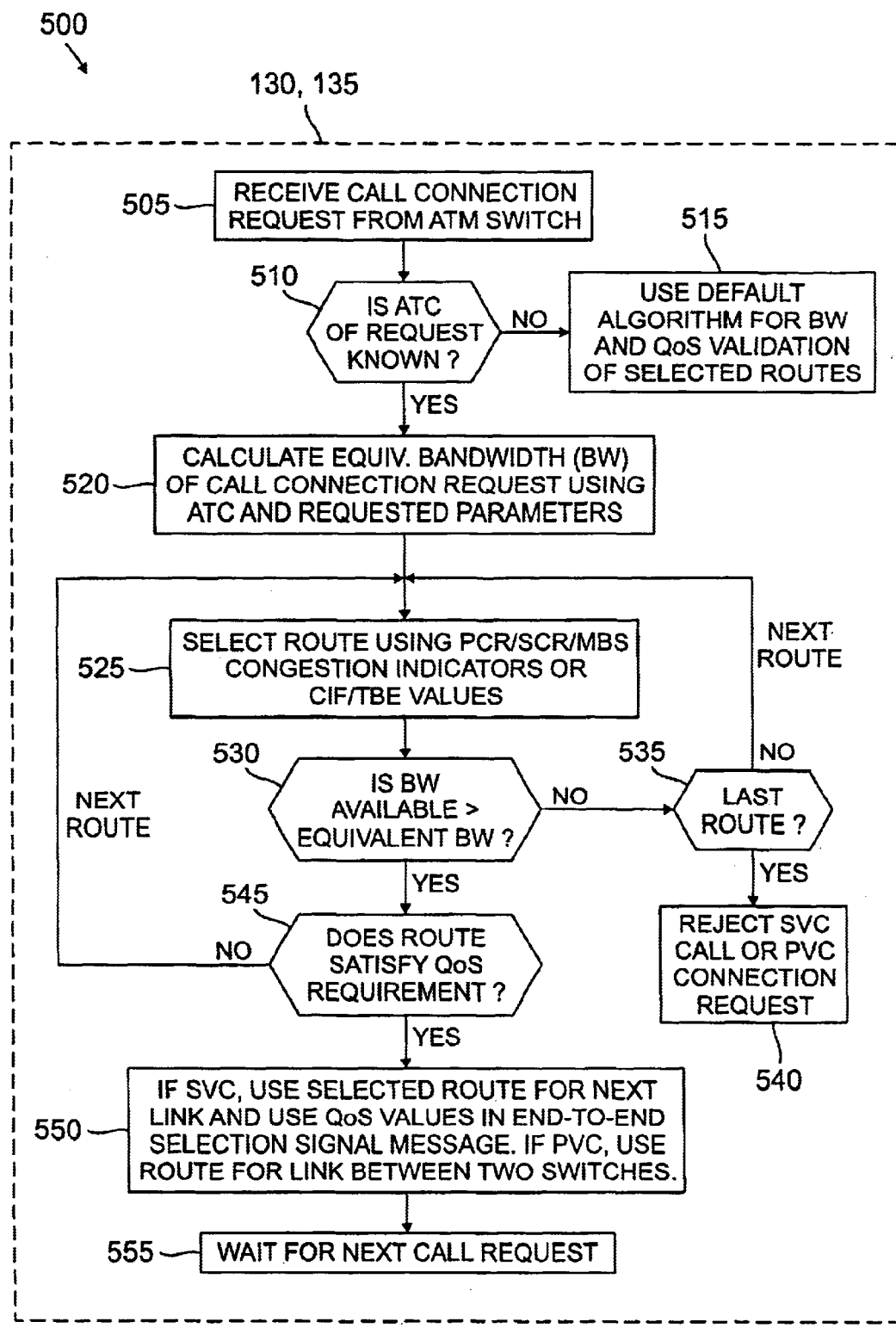
FIG. 6 is a flow diagram illustrating a route selection algorithm for validating bandwidth availability and QoS requirement compatibility of ATM switch routes according to an advantageous embodiment of the present invention.

FIG. 6 is a flow diagram 500 illustrating a route selection algorithm for validating bandwidth availability and QoS requirement compatibility of ATM switch routes according to an advantageous embodiment of the present invention. The route selection process is initiated when, for example, SCP 130/NMS 135 receives a call request from one of ATM switches 111–114 (process step 505). SCP 130/NMS 135 determines if the requested ATM Traffic Category (ATC) is known (process step 510). If the requested ATC is not known, SCP 130/NMS 135 uses the default algorithm for bandwidth and QoS data validation for the selected routes (process step 515).

If the ATC of the call request is known, ATM switch controller 450 calculates the equivalent bandwidth of the call request using the ATC and the requested parameters (process step 520). Next, ATM switch controller 450 selects a port from the available ports on the requesting switch based on the peak cell rate (PCR), sustained cell rate (SCR) and maximum burst size (MBS) values for that port stored in the adjoining switch QoS cell database 420. In the case of available bit rate (ABR) traffic, the ATM switch may select the port using the cells in flight (CIF) and transient buffer expected (TBE) values in the adjoining switch QoS cell database 420 (process step 525).

After a port has been selected, the ATM switch controller 450 determines if the bandwidth available on the selected port is greater than the equivalent bandwidth calculated by ATM switch controller 450 (process step 530). If the bandwidth available is less than the calculated equivalent bandwidth, ATM switch controller 450 determines if the selected port is the last available port (process step 535). If the selected port is not the last available port, ATM switch controller 450 selects another port as explained above in process step 525. If the selected port is the last available port, ATM switch controller 450 rejects the switched virtual circuit or permanent virtual circuit connection request that was received in process step 505 from the requesting ATM switch (process step 540).

However, if the bandwidth available on the selected port is greater than the equivalent bandwidth calculated by ATM switch controller 450 in process step 520, ATM switch controller 450 determines if the selected port satisfies the QoS requirements received in the call request from the requesting ATM switch (process step 545). If the selected port does not satisfy the QoS requirements, ATM switch controller 450 selects the next available port (return to step 525).

If the selected port does satisfy the QoS requirements for the call request, ATM switch controller 450 determines if the call request is a switched virtual circuit or a permanent virtual circuit. If the call request is for a switched virtual circuit, ATM switch controller 450 uses the selected route for the next link and uses the QoS values associated with the call request as part of the end-to-end selection signaling message. If the call request is for a permanent virtual circuit, ATM switch controller 450 uses the selected port as a permanent link between the requesting ATM switch and the selected adjoining ATM switch (process step 550). When the connection is finally established, ATM switch controller 450 then waits for the next call request to be received from a requesting ATM switch (process step 555).

More generally, conventional communications principles and theories are discussed in *The Irwin Handbook of Telecommunications*, by James Harry Green, Irwin Professional Publishing (2nd ed. 1992); *Data Communications Principles,* by R. D. Gitlin, J. F. Hayes and S. B. Weinstein, Plenum Press (1992); *Data Network Design*, by Darren L. Spohn, McGraw-Hill, Inc. (1993); *Optical Fiber Telecommunications II*, Stewart E. Miller and Ivan P. Kaminow, Academic Press (1988); *Integrated Optoelectronics*, by Mario Dagenais, Robert F. Leheny and John Crow, Academic Press (1995); *Voice and Data Communications Handbook*, by Bud Bates and Donald Gregory, McGraw-Hill, Inc. (1996); and *Newton's Telecom Dictionary*, by Harry Newton, Miller Freeman, Inc. (13$^{th}$ Ed. 1998). In particular, ATM technology is discussed in detail in *ISDN and Broadband ISDN with Frame Relay and ATM*, by William Stallings, Prentice Hall (3$^{rd}$ Ed. 1995). Each of the foregoing publications is incorporated herein by reference for all purposes as if fully set forth herein.

Although the present invention has been described in detail, those skilled in the art should understand that they can make various changes, substitutions and alterations herein without departing from the spirit and scope of the invention in its broadest form.

What is claimed is:

1. For use in an asynchronous transfer mode (ATM) network, an ATM switch controller capable of routing a call through said ATM network, comprising:
    a database capable of storing at least one of quality of service (QoS) data and congestion level data received over one or more special purpose connections from a plurality of ATM switches in said ATM network; and
    a route selection controller capable of receiving a call request from a first of said plurality of ATM switches and selecting a call route connection through said ATM network to a second of said plurality of ATM switches, wherein said second ATM switch adjoins said first ATM switch and said selected call route connection is selected in response to at least one of QoS data and congestion level data of said second ATM switch stored in said database.

2. The ATM switch controller set forth in claim 1 wherein said route selection controller is capable of detecting QoS cells containing at least one of QoS data and congestion level data received from said plurality of ATM switches.

3. The ATM switch controller set forth in claim 1 wherein said at least one of QoS data and congestion level data of said second switch is associated with a specific port on said second ATM switch.

4. The ATM switch controller set forth in claim 3 wherein said route selection controller selects said selected call route connection if said at least one of said QoS data and congestion level data associated with said specific port on said ATM switch compares favorably with a QoS requirement associated with said call request.

5. The ATM switch controller set forth in claim 1 wherein said ATM switch controller is disposed in a service control point in a Signaling System 7 (SS7) network.

6. The ATM switch controller set forth in claim 5 wherein at least one of said special purpose connections is a switched virtual circuit connection.

7. The ATM switch controller set forth in claim 1 wherein said route selection controller selects a call route connection through a selected plurality of said ATM switches and transfers substantially in parallel to said selected plurality of ATM switches call route connection data operable to cause said selected plurality of ATM switches to form said selected call route connection.

8. The ATM switch controller set forth in claim 7 wherein at least one of said special purpose connections is a permanent virtual connection.

9. An asynchronous transfer mode (ATM) network infrastructure comprising:
    a plurality of nodes capable of transmitting and receiving ATM cells;
    a plurality of ATM switches for transferring said ATM cells between said nodes;
    an ATM switch controller capable of routing a call through said ATM network, comprising:
        a database capable of storing at least one of quality of service (QoS) data and congestion level data received over one or more special purpose connections from a plurality of ATM switches in said ATM network; and
        a route selection controller capable of receiving a call request from a first of said plurality of ATM switches and selecting a call route connection through said ATM network to a second of said plurality of ATM switches, wherein said second ATM switch adjoins said first ATM switch and said selected call route connection is selected in response to at least one of QoS data and congestion level data of said second ATM switch stored in said database.

10. The ATM network infrastructure set forth in claim 9 wherein said route selection controller is capable of detecting QoS cells containing at least one of QoS data and congestion level data received from said plurality of ATM switches.

11. The ATM network infrastructure set forth in claim 9 wherein said at least one of QoS data and congestion level data of said second switch is associated with a specific port on said second ATM switch.

12. The ATM network infrastructure set forth in claim 11 wherein said route selection controller selects said selected call route connection if said at least one of said QoS data and congestion level data associated with said specific port on said ATM switch compares favorably with a QoS requirement associated with said call request.

13. The ATM network infrastructure set forth in claim 9 wherein said ATM switch controller is disposed in a service control point in a Signaling System 7 (SS7) network.

14. The ATM network infrastructure set forth in claim 13 wherein at least one of said special purpose connections is a switched virtual circuit connection.

15. The ATM network infrastructure set forth in claim 9 wherein said route selection controller selects a call route connection through a selected plurality of said ATM switches and transfers substantially in parallel to said selected plurality of ATM switches call route connection data operable to cause said selected plurality of ATM switches to form said selected call route connection.

16. The ATM network infrastructure set forth in claim 15 wherein at least one of said special purpose connections is a permanent virtual connection.

17. For use in an asynchronous transfer mode (ATM) switch controller disposed in an ATM network comprising a plurality of ATM switches, a method of routing a call through the ATM network comprising the steps of:
    receiving at least one of quality of service (QoS) data and congestion level data over one or more special purpose connections from a plurality of ATM switches;
    storing the received at least one of QoS data and congestion level data in a QoS database;
    receiving a call connection request from a requesting ATM switch;
    determining an end-user QoS requirement associated with the call connection request;

comparing the end-user QoS requirement with the stored at least one of quality of service (QoS) data and congestion level data associated with at least one ATM switch adjoining the requesting ATM switch; and selecting a call route connection through said ATM network to said at least one adjoining ATM switch.

18. The method set forth in claim 17 wherein at least one of the received QoS data and the received congestion level data is associated with a specific port on said at least one adjoining ATM switches.

19. The method set forth in claim 17 including the further step of detecting QoS cells containing at least one of QoS data and congestion level data received from the plurality of ATM switches.

20. The method set forth in claim 17 wherein the ATM switch controller is disposed in a service control point in a Signaling System 7 (SS7) network.

\* \* \* \* \*